J. MILLER.
MILK COOLER AND STRAINER.
APPLICATION FILED FEB. 5, 1914.
1,115,713.
Patented Nov. 3, 1914.
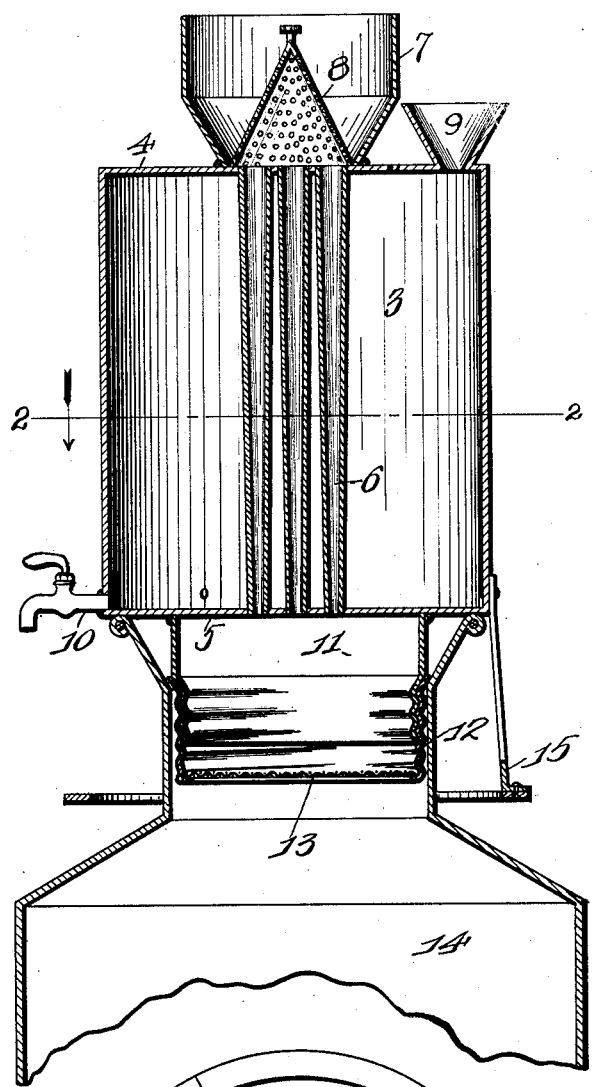
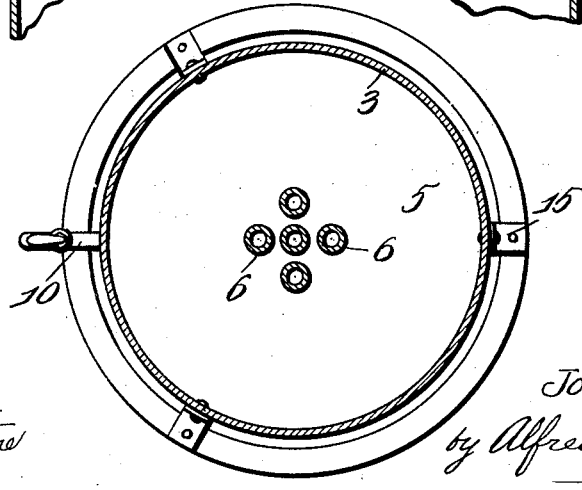
Witnesses
W. C. Stein
B. M. Austin
Inventor
Joseph Miller
by Alfred A. Eicks Atty.

UNITED STATES PATENT OFFICE.

JOSEPH MILLER, OF NEW DOUGLAS, ILLINOIS.

MILK COOLER AND STRAINER.

1,115,713.  Specification of Letters Patent.  Patented Nov. 3, 1914.

Application filed February 5, 1914. Serial No. 816,692.

*To all whom it may concern:*

Be it known that I, JOSEPH MILLER, a citizen of the United States, and resident of New Douglas, Illinois, have invented certain new and useful Improvements in Milk Coolers and Strainers, of which the following is a specification.

This invention relates to improvements in a milk cooler and strainer and has for its object a cooling container through which is passed the milk in order to remove the animal heat and suitably chill the same for shipping purposes.

A further object is to provide a container equipped with a plurality of tapered tubes entirely surrounded by cold water and strainers through which the milk passes before entering the milk cans.

The essential feature of my invention is to provide a portable device arranged to be placed on any milk can, the device containing cold water and the milk as taken from the cow is poured through tubes thoroughly chilling the milk.

Figure 1 is a vertical central sectional view of my invention in position on a milk can. Fig. 2 is a horizontal sectional view taken on the line 2—2 of Fig. 1.

My invention as illustrated consists of a container or water receptacle 3 provided with a top 4 and a bottom 5; in this container and approximately centrally located are tubes 6, said tubes being preferably tapered as shown, the smallest end or outlet being at the bottom. The purpose of this is to retard the flow of milk through said tubes so that the cold water in the container will thoroughly chill the milk as it passes downwardly.

On the top 4 and over the inlet ends of the tubes 6 is located a hopper 7 in which the milk is poured. In the hopper 7 is located a removable perforated cone 8 which acts as a strainer preventing any foreign substance from entering the tubes as well as retarding the flow of the milk into the tubes. The top 4 is also provided with a water inlet 9 in the form of a funnel through which water is poured into the container 3. On one side and near the bottom 5 is an outlet 10 in the form of a drain cock through which the water may pass for draining the contents. This inlet and outlet may be arranged to accommodate a continuous flow, where cold running water is conveniently available.

The bottom 5 is provided with a threaded sleeve 11 on which is detachably located a cap 12 provided with a sheet of gauze or screening 13 through which the cooled milk is filtered before entering into the can 14.

The container is also provided with a base or support 15 so arranged as to support the device when removed from its position on the can and to prevent the screening 13 from touching the floor.

In using this container where running water is not available, the same is filled with cold water and set on the top of the usual milk can. The milk pails are emptied into the hopper 7 and the contents permitted to slowly flow through the tubes 6 and into the can. By the time the milk has passed through the tubes the animal heat is removed and said milk properly cooled so that the same can be conveyed for shipment without souring.

Having fully described my invention what I claim is:

An article of the class described comprising a cooling compartment, tapered tubes extending through the same, a hopper for receiving the milk and guiding it to the tubes, a perforated cone located in the hopper, and a strainer located beneath the tubes, substantially as specified.

In testimony whereof, I have signed my name to this specification, in presence of two subscribing witnesses.

JOSEPH MILLER.

Witnesses:
ALFRED A. EICKS,
WALTER C. STEIN.